(12) United States Patent
Liu et al.

(10) Patent No.: US 10,379,227 B2
(45) Date of Patent: Aug. 13, 2019

(54) RADIATION DOSE MEASURING METHOD (71) Applicant: NEUBORON MEDTECH LTD., Nanjing, Jiangsu (CN)

(72) Inventors: Yuanhao Liu, Jiangsu (CN); Ming-Chen Hsiao, Jiangsu (CN)

(73) Assignee: NEUBORON MEDTECH LTD., Nanjing, Jiangsu Province (CN)

( * ) Notice: Subject to any disclaimer, the term of this patent is extended or adjusted under 35 U.S.C. 154(b) by 0 days.

(21) Appl. No.: 16/134,049

(22) Filed: Sep. 18, 2018

(65) Prior Publication Data
US 2019/0033468 A1    Jan. 31, 2019

Related U.S. Application Data

(63) Continuation of application No. PCT/CN2016/110650, filed on Dec. 19, 2016.

(30) Foreign Application Priority Data

Jun. 1, 2016    (CN) .......................... 2016 1 0377646

(51) Int. Cl.
*G01T 1/04*    (2006.01)
*G01T 1/11*    (2006.01)
(Continued)

(52) U.S. Cl.
CPC ................. *G01T 1/11* (2013.01); *G01T 1/02* (2013.01); *G01T 1/023* (2013.01); *G01T 1/161* (2013.01);
(Continued)

(58) Field of Classification Search
CPC . G01T 1/11; G01T 1/023; G01T 1/161; G01T 3/008; G01T 3/06; G01T 3/00; G01T 1/02
See application file for complete search history.

(56) References Cited

U.S. PATENT DOCUMENTS 4,039,834 A  *  8/1977  Lucas ....................... G01T 1/11
                                                                        250/337
5,567,936 A    10/1996  Basso
(Continued)

FOREIGN PATENT DOCUMENTS

CN    102176047 A    9/2011
CN    103336293 A    10/2013
(Continued)

OTHER PUBLICATIONS

International Search Report of PCT/CN2016/110650, dated Apr. 19, 2017.
(Continued)

*Primary Examiner* — Kiho Kim
(74) *Attorney, Agent, or Firm* — Locke Lord LLP; Tim Tinkang Xia (57) ABSTRACT

Provided are a method for measuring dose distribution in a mixed radiation field of neutrons and gamma rays, and a method for measuring beam uniformity of a mixed radiation field of neutrons and gamma rays. The planar dose measuring method includes: a step of obtaining a total dose of neutrons and gamma rays by measuring with a dosimeter; and a step of analyzing a neutron dose. The method may effectively measure the doses of neutrons and gamma rays, may be applied to beam measurement and treatment plan validation, and thus improve the quality of treatment.

16 Claims, 3 Drawing Sheets

(51) Int. Cl.
  *G01T 1/02* (2006.01)
  *G01T 1/161* (2006.01)
  *G01T 3/00* (2006.01)
  *G01T 3/06* (2006.01)
(52) U.S. Cl.
  CPC ............... *G01T 3/00* (2013.01); *G01T 3/008* (2013.01); *G01T 3/06* (2013.01)

(56) References Cited

U.S. PATENT DOCUMENTS

2013/0112885 A1* 5/2013 Takahashi .......... C09K 11/7734 250/367
2013/0181137 A1* 7/2013 Watanabe .......... C09K 11/7734 250/369
2014/0110601 A1 4/2014 Liu et al.

FOREIGN PATENT DOCUMENTS

| CN | 104464856 A | 3/2015 | | |
|----|----|----|----|----|
| CN | 104749605 A | 7/2015 | | |
| CN | 105093261 A | 11/2015 | | |
| EP | 2290406 A2 | * 3/2011 | ............... | G01T 3/06 |
| EP | 2573590 A1 | 3/2013 | | |
| JP | 2002-006055 | * 1/2002 | ............... | G01T 3/06 |

OTHER PUBLICATIONS

Ming-Chen Hsiao et al., Neutron response of GafChromic® EBT2 film, Physics in Medicine and Biology, 2013, 1391-1413.

Zhixiong Wan, 24Na activity neutron dose MC simulation technique and mathematical model analysis, 2012, Chengdu University of Technology in Nuclear Technology.

Baojie Wei et al., Neutron tube and its application technology, Northeast normal university press, 1997.

European Patent Office, Search Report of PCT/CN2016110650, dated Apr. 17, 2019.

* cited by examiner

RADIATION DOSE MEASURING METHOD

RELATED APPLICATION INFORMATION

This application is a continuation of International Application No. PCT/CN2016/110650, filed on Dec. 19, 2016, which claims priority to Chinese Patent Application No. 201610377646.0, filed on Jun. 1, 2016, the disclosures of which are hereby incorporated by reference.

FIELD OF THE DISCLOSURE

The present disclosure relates generally to a dose measuring method, and more particularly to a radiation dose measuring method.

BACKGROUND OF THE DISCLOSURE

Radiation is not only related to daily life, but also omnipresent. Cosmic rays and surface radiation existed in natural environment collectively referred to as natural environmental background radiation, which will vary according to terrain and geology. In addition to natural background radiation, radiation sources caused by human factors have a variety of applications of radiation on people's livelihood, wherein the medical radiation applications of radiation diagnosis, radiation therapy and nuclear medicine are the most common.

The principle of radiation therapy is mainly the use of high-energy radiation, usually indirect ionizing radiation, acting with the tumor cells so that the tumor cells are ionized or excited to produce toxic free radicals, which in turn cause cell damage; or the radiation energy released by direct ionizing radiation causing single or double helix break in DNA of the cancer cells. Regarding the treatment prescription dose, the physician is able to confirm the feasibility of the treatment and the expected therapeutic effect, based on a detailed assessment of the radiation doses received by malignant tumor and normal tissue according to the complex treatment plan. When the treatment team confirms the treatment plan, the irradiation parameters of the treatment plan will be delivered to the treatment instrument. With regular beam quality assurance operations, the difference between the dose received by the patient and the prescription dose of the treatment plan is determined to be less than the error range tolerated by the clinical treatment. The patient completes the treatment after a series of irradiation. The principle of radiation therapy is based on radiation damage theory in radiation biology. It is known from radiation dose-tissue volume curve that middle section of the curve has the largest slope, at where if the dose changes 5%, it can affect the tumor control rate by 10% to 20%, and will likely cause the chance of normal tissue complications to be as high as 20% to 30%. So the most important part of radiotherapy is to give the correct prescription dose.

Modern medical radiotherapy equipments are mostly high-energy electronic linear accelerator, such as high-energy X-ray therapy machine; In addition, heavy charged particle radiation therapy technology for example proton therapy, carbon ion therapy and others also begins to flourish, showing that radiation therapy technology can indeed be used as a weapon against malignant tumors. Therefore, radiotherapy techniques need to be combined with more prudent quality assurance measures and dose validation programs to ensure the quality of the patient's treatment.

However, when faced with a mixed radiation field composed of a variety of radiations, the mixed radiation field of neutrons and gamma rays generated by the boron neutron capture therapy system is taken as an example (not limited thereto). Dose measurement of boron neutron capture therapy beam is an important issue in clinical treatment, and its difficulty lies in the need to be able to effectively distinguish the dose caused by the different radiation. Commonly used measurement tools such as paired ionizing chamber and thermoluminescent dosimeter cannot perform dose measurement in a wide range over a short period of time. However, in practice, in radiotherapy beam quality assurance or treatment plan validation, a two-dimensional planar dose distribution must be used to thoroughly evaluate the beam characteristics and the quality of the treatment plan. Therefore, it is necessary to propose a radiation dose measuring method for the mixed radiation field.

The statements in this section merely provide background information related to the present disclosure and may not constitute prior art.

SUMMARY

An object of the present disclosure is to provide a method for measuring dose distribution in a mixed radiation field of neutrons and gamma rays; and another object of the present disclosure is to provide a method for measuring beam uniformity of a mixed radiation field of neutrons and gamma rays. Specifically, the embodiments of the present disclosure provide a radiation dose measuring method for a mixed radiation field of neutrons and gamma rays, and the radiation dose measuring method includes: a step of obtaining a total dose of neutrons and gamma rays by measuring with a dosimeter; and a step of analyzing a neutron dose. The present disclosure may effectively measure the doses of neutrons and gamma rays, may be applied to beam measurement and treatment plan validation, and thus improve the quality of treatment.

Implementations of this aspect may include one or more of the following features. Implementations of this aspect may include one or more of the following features.

Further, the dosimeter may be selected from the group consisting of film dosimeter, thermoluminescent dosimeter, alanine dosimeter and gel dosimeter. Certainly, it is well known to those skilled in the art that dosimeters capable of measuring the total dose of neutrons and gamma rays are not limited to the examples described above. If film dosimeter is chosen, a two-dimensional planar dose may be measured; if thermoluminescent or alanine dosimeter is chosen, a plane may be formed by a number of single dosimeter to analyze a two-dimensional planar dose of neutrons; if gel dosimeter is chosen, a three-dimensional dose of neutrons may be analyzed. Thus, the dosimeter chosen may be not limited to single point dosimeter, plane dosimeter, or three-dimensional dosimeter, and the measured dose may be not limited to two-dimensional planar dose or three-dimensional dose.

In addition, the dosimeter may also use active inflatable detectors, for example, those of using inflatable detector structure as base, such as He-3 filled proportional counter, $BF_3$ proportional counter, fission chamber, boron ionization chamber; the dosimeter can also use scintillation probe and semiconductor probe. The scintillation probe can be classified into organic and inorganic materials, for the use of thermal neutrons detection, the scintillation probe may usually be added with large thermal neutron capture cross-section elements for example Li or B. In brief, most of the neutron energy detected by this type of detectors are thermal neutrons, and all the detectors rely on the heavy charged particles and nuclear fission fragments, release from the capture or nuclear fission reaction between neutrons and elements, producing a large number of ionized pairs in the ionization chamber. The current signal can be converted to voltage pulse signal with these charges being collected and then converted with appropriate circuit. By analyzing the magnitude of the voltage pulse, it is easy to distinguish the neutron signal and γ signal. In high-intensity neutron fields, such as BNCT, it is possible to appropriately reduce the gas pressure in the ionization chamber, the concentration of the fissile material or boron coating, or the concentration of elements with a large neutron capture cross-section in the scintillation probe, thereby effectively reduce its sensitivity to neutrons.

Further, the step of analyzing a neutron dose includes a step of calculating and obtaining a neutron dose in the center region of the dosimeter; a step of correcting the neutron detection efficiency of the dosimeter by the neutron relative effect of optical density of the dosimeter; and a step of analyzing neutron intensity distribution. By obtaining the neutron dose in the central region of the dosimeter, correcting the neutron detection efficiency of the dosimeter by the neutron relative effect of optical density of the dosimeter, and multiplying the neutron intensity distribution of the dosimeter, the neutron dose in the dosimeter may be analyzed.

Preferably, the neutron dose in the central region of the dosimeter may be calculated by a Monte Carlo method. The Monte Carlo method is a tool that may accurately simulate the collision trajectories and energy distributions of nuclear particles in the three-dimensional space inside the irradiated target. The Monte Carlo calculations should detail the proportions and geometries of chemical elements in each layer of the film, which may be provided by the film manufacturer.

Further, the neutron intensity distribution may be obtained by irradiating a conversion material with radiation. So that the neutron intensity distribution of the dosimeter outside the central region may be known by means of measurement.

Preferably, the radiation released by neutron activation of the conversion material may be recorded by a digital image plate to measure the neutron intensity distribution. The conversion material may be a natural copper sheet.

Further, the radiation dose measuring method may be directed to a mixed radiation field of neutrons and gamma rays for a neutron capture therapy system.

Further, an indirect radiation dose measurement may also be performed using the dosimeter. The step of obtaining a total dose of neutrons and gamma rays by measuring with a dosimeter is a step of obtaining the total dose of neutrons and gamma rays by indirect measurement with the dosimeter.

The embodiments of the present disclosure also provide a radiation dose measuring method for a mixed radiation field, and the mixed radiation field includes a first ray and a second ray, the radiation dose measuring method includes: a step of obtaining a total dose of the first ray and the second ray by measuring with a dosimeter, and the first ray is a neutron ray; and a step of analyzing a neutron dose. The present disclosure may effectively measure the doses of neutrons, may be applied to beam measurement and treatment plan validation, and thus improve the quality of treatment.

Implementations of this aspect may include one or more of the following features. Implementations of this aspect may include one or more of the following features.

Further, the radiation dose measuring method is directed to a mixed radiation field for a radiation therapy system.

Preferably, the second ray is a gamma ray, and the radiation therapy system is a neutron capture therapy system.

Further, the dosimeter may be selected from the group consisting of film dosimeter, thermoluminescent dosimeter, alanine dosimeter and gel dosimeter. Certainly, it is well known to those skilled in the art that dosimeters capable of measuring the total dose of neutrons and gamma rays are not limited to the examples described above. If film dosimeter is chosen, a two-dimensional planar dose may be measured; if thermoluminescent or alanine dosimeter is chosen, a plane may be formed by a number of single dosimeter to analyze a two-dimensional planar dose of neutrons; if gel dosimeter is chosen, a three-dimensional dose of neutrons may be analyzed. Thus, the dosimeter chosen may be not limited to single point dosimeter, plane dosimeter, or three-dimensional dosimeter, and the measured dose may be not limited to two-dimensional planar dose or three-dimensional dose.

In addition, the dosimeter may also use active inflatable detectors, for example, those of using inflatable detector structure as base, such as He-3 filled proportional counter, $BF_3$ proportional counter, fission chamber, boron ionization chamber; the dosimeter can also use scintillation probe and semiconductor probe. The scintillation probe can be classified into organic and inorganic materials, for the use of thermal neutrons detection, the scintillation probe may usually be added with large thermal neutron capture cross-section elements for example Li or B. In brief, most of the neutron energy detected by this type of detectors are thermal neutrons, and all the detectors rely on the heavy charged particles and nuclear fission fragments, release from the capture or nuclear fission reaction between neutrons and elements, producing a large number of ionized pairs in the ionization chamber. The current signal can be converted to voltage pulse signal with these charges being collected and then converted with appropriate circuit. By analyzing the magnitude of the voltage pulse, it is easy to distinguish the neutron signal and γ signal. In high-intensity neutron fields, such as BNCT, it is possible to appropriately reduce the gas pressure in the ionization chamber, the concentration of the fissile material or boron coating, or the concentration of elements with a large neutron capture cross-section in the scintillation probe, thereby effectively reduce its sensitivity to neutrons.

Further, the step of analyzing a neutron dose includes a step of calculating and obtaining a neutron dose in the center region of the dosimeter; a step of correcting the neutron detection efficiency of the dosimeter by the neutron relative effect of optical density of the dosimeter; and a step of analyzing neutron intensity distribution. By obtaining the neutron dose in the central region of the dosimeter, correcting the neutron detection efficiency of the dosimeter by the neutron relative effect of optical density of the dosimeter, and multiplying the neutron intensity distribution of the dosimeter, the neutron dose in the dosimeter may be analyzed.

Preferably, the neutron dose in the central region of the dosimeter may be calculated by a Monte Carlo method. The Monte Carlo method is a tool that may accurately simulate the collision trajectories and energy distributions of nuclear particles in the three-dimensional space inside the irradiated target. The Monte Carlo calculations should detail the proportions and geometries of chemical elements in each layer of the film, which may be provided by the film manufacturer.

Further, the neutron intensity distribution may be obtained by irradiating a conversion material with radiation. So that the neutron intensity distribution of the dosimeter outside the central region may be known by means of measurement.

Preferably, the radiation released by neutron activation of the conversion material may be recorded by a digital image plate to measure the neutron intensity distribution. The conversion material may be a natural copper sheet.

Further, an indirect radiation dose measurement may also be performed using the dosimeter. The step of obtaining a total dose of neutrons and gamma rays by measuring with a dosimeter is a step of obtaining the total dose of neutrons and gamma rays by indirect measurement with the dosimeter.

The embodiments of the present disclosure again provide a radiation dose measuring method for a mixed radiation field of neutrons and gamma rays, and the radiation dose measuring method includes: a step of obtaining a total dose of neutrons and gamma rays by measuring with a dosimeter; and a step of separating the neutron dose and gamma dose. The present disclosure may effectively measure the doses of neutrons, may be applied to beam measurement and treatment plan validation, and thus improve the quality of treatment.

Implementations of this aspect may include one or more of the following features. Implementations of this aspect may include one or more of the following features.

Further, the step of separating the neutron dose and gamma dose comprises a step of analyzing the neutron dose; a step of obtaining the gamma dose by subtracting the neutron dose from the total dose of neutrons and gamma rays.

Further, the step of analyzing a neutron dose includes a step of calculating and obtaining a neutron dose in the center region of the dosimeter; a step of correcting the neutron detection efficiency of the dosimeter by the neutron relative effect of optical density of the dosimeter; and a step of analyzing neutron intensity distribution. By obtaining the neutron dose in the central region of the dosimeter, correcting the neutron detection efficiency of the dosimeter by the neutron relative effect of optical density of the dosimeter, and multiplying the neutron intensity distribution of the dosimeter, the neutron dose in the dosimeter may be analyzed.

Preferably, the neutron dose in the central region of the dosimeter may be calculated by a Monte Carlo method. The Monte Carlo method is a tool that may accurately simulate the collision trajectories and energy distributions of nuclear particles in the three-dimensional space inside the irradiated target. The Monte Carlo calculations should detail the proportions and geometries of chemical elements in each layer of the film, which may be provided by the film manufacturer.

Further, the neutron intensity distribution may be obtained by irradiating a conversion material with radiation. So that the neutron intensity distribution of the dosimeter outside the central region may be known by means of measurement.

Preferably, the radiation released by neutron activation of the conversion material may be recorded by a digital image plate to measure the neutron intensity distribution. The conversion material may be a natural copper sheet.

Further, the dosimeter may be selected from the group consisting of film dosimeter, thermoluminescent dosimeter, alanine dosimeter and gel dosimeter. Certainly, it is well known to those skilled in the art that dosimeters capable of measuring the total dose of neutrons and gamma rays are not limited to the examples described above. If film dosimeter is chosen, a two-dimensional planar dose may be measured; if thermoluminescent or alanine dosimeter is chosen, a plane may be formed by a number of single dosimeter to analyze a two-dimensional planar dose of neutrons; if gel dosimeter is chosen, a three-dimensional dose of neutrons may be analyzed. Thus, the dosimeter chosen may be not limited to single point dosimeter, plane dosimeter, or three-dimensional dosimeter, and the measured dose may be not limited to two-dimensional planar dose or three-dimensional dose.

In addition, the dosimeter may also use active inflatable detectors, for example, those of using inflatable detector structure as base, such as He-3 filled proportional counter, $BF_3$ proportional counter, fission chamber, boron ionization chamber; the dosimeter can also use scintillation probe and semiconductor probe. The scintillation probe can be classified into organic and inorganic materials, for the use of thermal neutrons detection, the scintillation probe may usually be added with large thermal neutron capture cross-section elements for example Li or B. In brief, most of the neutron energy detected by this type of detectors are thermal neutrons, and all the detectors rely on the heavy charged particles and nuclear fission fragments, release from the capture or nuclear fission reaction between neutrons and elements, producing a large number of ionized pairs in the ionization chamber. The current signal can be converted to voltage pulse signal with these charges being collected and then converted with appropriate circuit. By analyzing the magnitude of the voltage pulse, it is easy to distinguish the neutron signal and γ signal. In high-intensity neutron fields, such as BNCT, it is possible to appropriately reduce the gas pressure in the ionization chamber, the concentration of the fissile material or boron coating, or the concentration of elements with a large neutron capture cross-section in the scintillation probe, thereby effectively reduce its sensitivity to neutrons.

Further, the radiation dose measuring method may be directed to a mixed radiation field of neutrons and gamma rays for a neutron capture therapy system.

Further, an indirect radiation dose measurement may also be performed using the dosimeter. The step of obtaining a total dose of neutrons and gamma rays by measuring with a dosimeter is a step of obtaining the total dose of neutrons and gamma rays by indirect measurement with the dosimeter.

Further areas of applicability will become apparent from the description provided herein. It should be understood that the description and specific examples are intended for purposes of illustration only and are not intended to limit the scope of the present disclosure.

The drawings described herein are for illustrative purposes only of selected embodiments and not all possible implementations, and are not intended to limit the scope of

DETAILED DESCRIPTION

Embodiments of the present disclosure will now be described in further detail with reference to the accompanying drawings in order to enable those skilled in the art to practice with reference to the teachings.

A radiation dose measuring method for a mixed radiation field of neutrons and gamma rays used in a neutron capture therapy system is a preferred embodiment of the present disclosure. Certainly, it is well known to those skilled in the art that the mixed radiation field may be a mixed radiation field of neutrons and gamma rays generated by other radiation therapy means, or may be a mixed radiation field of neutrons and other rays generated by other radiation therapy means. Accordingly, it is an object of the present disclosure to provide a method for separating a neutron dose from other radiation doses in a mixed radiation field in which neutrons and other radiation is present. The method is effective for measuring the planar dose of neutrons and other radiations, especially neutrons and gamma rays, and will be applied to beam measurement and treatment planning validation to improve the quality of treatment. The following is a brief introduction to neutron capture therapy, especially boron neutron capture therapy.

Neutron capture therapy (NCT) has been increasingly practiced as an effective cancer curing means in recent years, and BNCT is the most common. Neutrons for NCT may be supplied by nuclear reactors or accelerators. Take AB-BNCT for example, its principal components include, in general, an accelerator for accelerating charged particles (such as protons and deuterons), a target, a heat removal system and a beam shaping assembly. The accelerated charged particles interact with the metal target to produce the neutrons, and suitable nuclear reactions are always determined according to such characteristics as desired neutron yield and energy, available accelerated charged particle energy and current and materialization of the metal target, among which the most discussed two are $^7$Li (p, n) $^7$Be and $^9$Be (p, n) $^9$B and both are endothermic reaction. Their energy thresholds are 1.881 MeV and 2.055 MeV respectively. Epithermal neutrons at a keV energy level are considered ideal neutron sources for BNCT. Theoretically, bombardment with lithium target using protons with energy slightly higher than the thresholds may produce neutrons relatively low in energy, so the neutrons may be used clinically without many moderations. However, Li (lithium) and Be (beryllium) and protons of threshold energy exhibit not high action cross section. In order to produce sufficient neutron fluxes, high-energy protons are usually selected to trigger the nuclear reactions.

Boron neutron capture therapy (BNCT) takes advantage that the boron ($^{10}$B)-containing pharmaceuticals have high neutron capture cross section and produces $^4$He and $^7$Li heavy charged particles through $^{10}$B(n,α)$^7$Li neutron capture and nuclear fission reaction. The two charged particles, with average energy at about 2.33 MeV, are of linear energy transfer (LET) and short-range characteristics. LET and range of the alpha particle are 150 keV/micrometer and 8 micrometers respectively while those of the heavy charged particle $^7$Li are 175 keV/micrometer and 5 micrometers respectively, and the total range of the two particles approximately amounts to a cell size. Therefore, radiation damage to living organisms may be restricted at the cells' level. When the boronated pharmaceuticals are gathered in the tumor cells selectively, only the tumor cells will be destroyed locally with a proper neutron source on the premise of having no major normal tissue damage.

The following will focus on how to perform radiation dose measurement in the case of mixed radiation field of neutrons and gamma rays.

Figure 1:
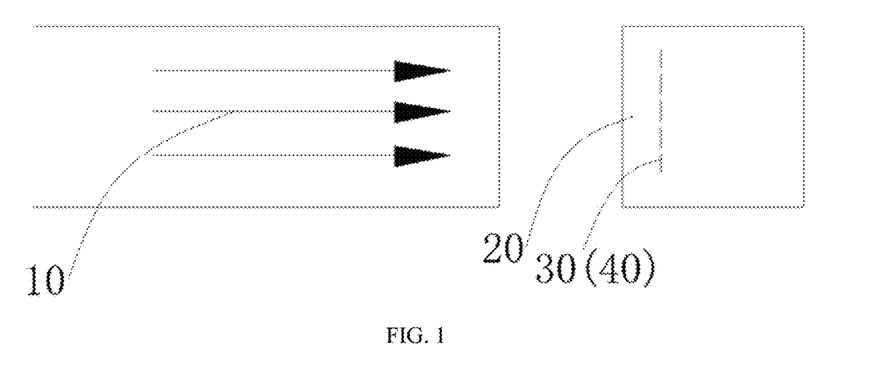
FIG. 1 is a schematic plan view of a dosimeter placed in a mixed radiation field for irradiation in an embodiment of the present disclosure.

Refer to FIG. 1, which is a schematic plan view of a dosimeter placed in a mixed radiation field for irradiation. A mixed radiation field 10 has mixed radiation rays of two kinds of neutrons and gamma rays, and a dosimeter 30 is placed in a carrier 20. The carrier 20 may be made of a variety of shapes or materials, and in this embodiment a 30×30×30 cm$^3$ acrylic material is used. As is well known to those skilled in the art, the carrier may also be made of other materials or shapes. In this embodiment, a film dosimeter was used to perform a two-dimensional planar dose measurement on the dose of the mixed radiation field. Certainly, as is well known to those skilled in the art, the dosimeter can be any dosimeter capable of measuring and obtaining the total dose of neutrons and gamma rays, for example, the dosimeter may also be selected from the group consisting of thermoluminescent dosimeter, alanine dosimeter or gel dosimeter. If thermoluminescent or alanine dosimeter is chosen, a plane can be formed by a number of single dosimeter to analyze the two-dimensional planar dose of neutrons; if gel dosimeter is chosen, the three-dimensional dose of neutrons can be analyzed. Thus, the dosimeter chosen is not limited to single point dose dosimeter, plane dosimeter, or three-dimensional dosimeter, and the measured dose is not limited to two-dimensional planar dose or three-dimensional dose.

Figure 2:
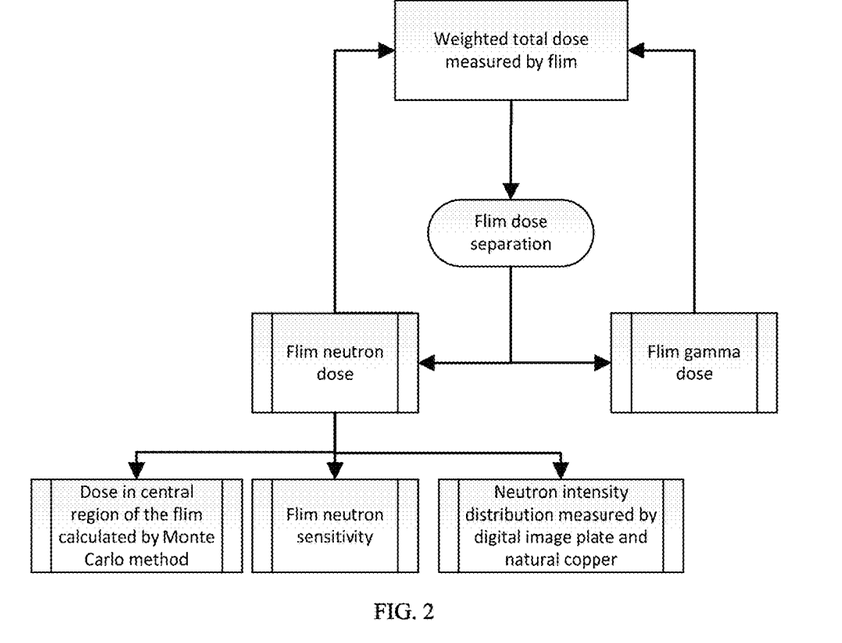
FIG. 2 is a schematic flow diagram of a planar dose measuring method in an embodiment of the present disclosure.

Refer to FIG. 2, which is a schematic flow diagram of a planar dose measuring method in an embodiment of the present disclosure. The planar dose measuring method in this embodiment mainly includes the following steps: a step of analyzing the neutron dose obtained by measuring with the film dosimeter and a step of obtaining the total dose of neutrons and gamma rays by measuring with the film dosimeter. That is to achieve the separation of neutron and gamma dose in the film. Wherein the step of analyzing the neutron dose obtained by measuring with the film dosimeter includes: a step of obtaining a neutron dose in the central region of the film dosimeter from a Monte Carlo method calculation, a step of determining the neutron sensitivity of the film dosimeter, which is the step of correcting the neutron detection efficiency of the dosimeter by the neutron relative effect of optical density of the dosimeter; and a step of analyzing the neutron intensity distribution.

Figure 3:
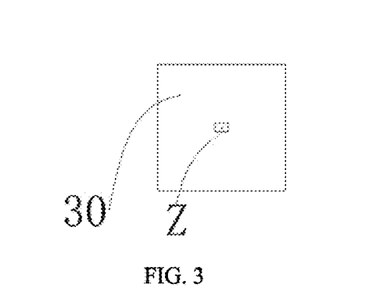
FIG. 3 is a schematic plan view of a film dosimeter used in an embodiment of the present disclosure.

The central region of the dosimeter can obtain the neutron dose in this region of the dosimeter by the calculation of the Monte Carlo method. As shown in FIG. 3, the film dosimeter 30 used in the present embodiment as example, it has a size of 20×20 cm$^2$ and its center region Z is located at the center of the film dosimeter, with a size of 2×3 cm$^2$. Certainly, as is well known to those skilled in the art, other sizes or other regions as the central region may also be used. It is estimated that the neutron dose of the film dosimeter calculated by the Monte Carlo method in this region is comparable to the actual neutron dose of the film dosimeter. Thus, the neutron dose calculated by the Monte Carlo method can be used as the actually measured neutron dose of the film dosimeter.

The step of determining the neutron sensitivity of the film dosimeter is to correct the neutron detection efficiency of the film dosimeter by $RE_n$ (neutron relative effect of optical density of the dosimeter). The efficiency values can be provided by a publication of Hsiao et al., Published in 2013 [M.-C. Hsiao, Y.-H. Liu, W.-L. Chen, S.-H. Jiang, "Neutron Response of GafChromic EBT2 Film", 58(5), 1391-413 Phys. Med. Biol., 2013.], incorporated herein by reference in its entirety. Specifically, it will be described in detail below.

The step of resolving the neutron intensity distribution is to obtain the neutron intensity distribution of the dosimeter outside the central region by means of the measurement. Specifically, it will be described in detail below. The determined neutron intensity distribution is multiplied by the neutron dose in the central area of the dosimeter (corrected by $RE_n$) to analyze the neutron dose in the dosimeter. And the gamma dose is obtained by subtracting the neutron dose from the weighted total dose of neutrons and gamma rays obtained by measuring with the dosimeter.

The radiation dose measuring method in the present embodiment will be described in detail below. It is well known to those skilled in the art that the sequence of steps described below is only the sequence of steps used in this embodiment and is not intended to define the sequence of steps in the present disclosure.

Figure 6:
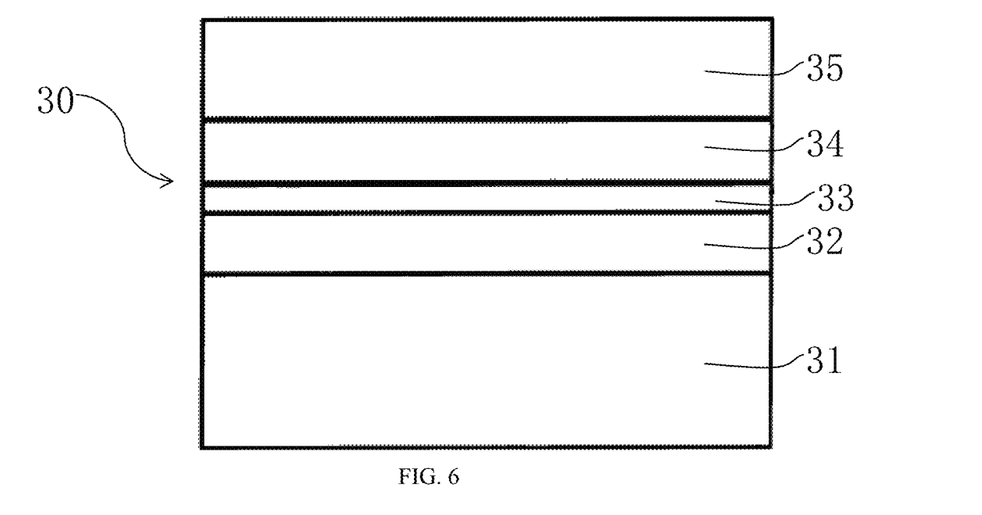
FIG. 6 is a schematic cross-sectional view of a film dosimeter used in an embodiment of the present disclosure.

I. Obtaining the Total Dose of Neutrons and Gamma Rays by Measuring with Dosimeter Radiation dyed film (film dosimeter) can be summarized as using special chemical molecules to interact with the radiation to be measured, causing energy level changes such as bond breaking in the chemical molecule, followed by polymerization reaction or other discoloration reactions, resulting in observable discoloration of the appearance of the film. The degree of discoloration can be used to estimate the dose of the radiation to be measured. As shown in FIG. 6, the currently commonly used clinical radiation dyed film is the External Beam Therapy 2 (EBT2) GAFCHROMIC® film 30 manufactured by ISP, Inc., which in turn includes a base layer 31, an action layer 32 connected to the base layer 31, a surface layer 33 connected to the action layer 32, an adhesive layer 34 connected to the surface layer 33, and a top layer 50 connected to the adhesive layer 34 from the bottom to up. The structure and composition ratio of the EBT2 film 30 are shown in Table 1.

TABLE 1

EBT2 film structure and its composition ratio

| Layers | Thickness (μm) | Composition (atom %) | | | | | | | |
|---|---|---|---|---|---|---|---|---|---|
| | | H | Li | C | N | O | Cl | K | Br |
| Top layer | 50 | 36.4 | 0 | 45.5 | 0 | 18.2 | 0 | 0 | 0 |
| Adhesive layer | 25 | 57.1 | 0 | 33.3 | 0 | 9.5 | 0 | 0 | 0 |
| Surface layer | 5 | 56.9 | 0.9 | 25.7 | 0 | 15.6 | 0.9 | 0 | 0 |
| Action Layer | 30 | 58.3 | 0.8 | 29.6 | 0.1 | 10.7 | 0.3 | 0.1 | 0.1 |
| Base layer | 175 | 36.4 | 0 | 45.5 | 0 | 18.2 | 0 | 0 | 0 |

Based on the high spatial resolution and good response reproducibility of the radiation dyed film, planar dose measuring techniques are developed for boron neutron capture therapy. Since the response of the radiation dyed film after radiation irradiation can be converted into the absorbed dose by the dose-response function, the film response OD of the radiation dyed film after being irradiated by the beam of boron neutron capture therapy is listed as follows: Formula (1) and Formula (2):

$$OD|_{D_\gamma + D_n} = \int_0^{D_\gamma} h'_\gamma(D)dD + \int_{D_\gamma}^{D_\gamma + RE_n D_n} h'_\gamma(D)dD = \int_0^{D_{\gamma-Eq}} h'_\gamma(D)dD \quad \text{Formula (1)}$$

$$D_{\gamma-Eq} = D_\gamma + RE_n D_n \quad \text{Formula (2)}$$

Wherein:
$D_{65}$: gamma absorbed dose of the film dosimeter (Unit: Gy)
$D_n$: neutron absorbed dose of the film dosimeter (Unit: Gy)
$h_\gamma'(D)$: differential correcting function of absorbed dose and optical density
$RE_n$: neutron relative effect of optical density of film
$D_{\gamma-Eq}$: sum of the gamma absorbed dose and the neutron absorbed dose of the film dosimeter (Unit: Gy)

Therefore, according to the dose response function $h_\gamma'(D)$ of the film dosimeter, the response OD on the film dosimeter is converted into the weighted total dose $D_{\gamma-Eq}$. The gamma absorbed dose and the neutron absorbed dose in the dosimeter can be analyzed separately after the neutron dose is analyzed, under a reference value given by the $RE_n$ or obtained from the above-mentioned literature.

The EBT2 film 30 is placed in a 30×30×30 cm³ acrylic phantom and irradiated for 30 minutes at a depth of 2 cm and 5 cm in the phantom, and the size of the EBT2 film 30 is 20×20 cm². The radiation dyed film 30 is irradiated by the boron neutron capture therapy beam to measure the weighted total dose when placed at the preset depth in the phantom. After the irradiation, the film response is read by a high-order color scanner, the file type after the scan is stored as the label image format, and then the image processing program is used to read the average specific spectral response and calculate the optical density. The specific spectra referred to herein are mainly red and green visible light, and the suitable spectral response is selected according to the dose range. In this embodiment, autograph of all the irradiated films is about 6 hours, and then the film response is read by a green light meter.

II. Analyzing the Neutron Dose

1. The Step of Analyzing the Neutron Intensity Distribution

The metal foil with a large neutron capture cross section is used as conversion material. Because neutrons have unique cross-section (the probability of action) for acting on the material, and the cross-section is energy-related. In this part, the conversion material to be choose depends on the interested neutron energy and practicality. The radiation, which is released by decay after the conversion material activated by neutrons, can be recorded using a digital imaging plate or other photographic material, and the approach completely eliminates the influence causing by the mixed radiation field of BNCT accompanying with gamma radiation. The neutron dose relative distribution of the dosimeter can be measured using a digital imaging plate (or other photographic material) in collocation with neutron activated conversion material with the same size of the film.

Figure 4:
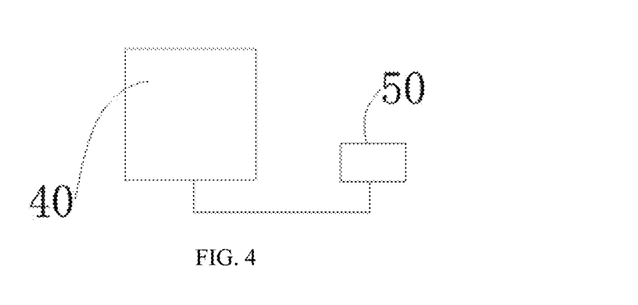
FIG. 4 is a schematic plan view of a neutron conversion material and a digital image board used in an embodiment of the present disclosure.
Figure 5:
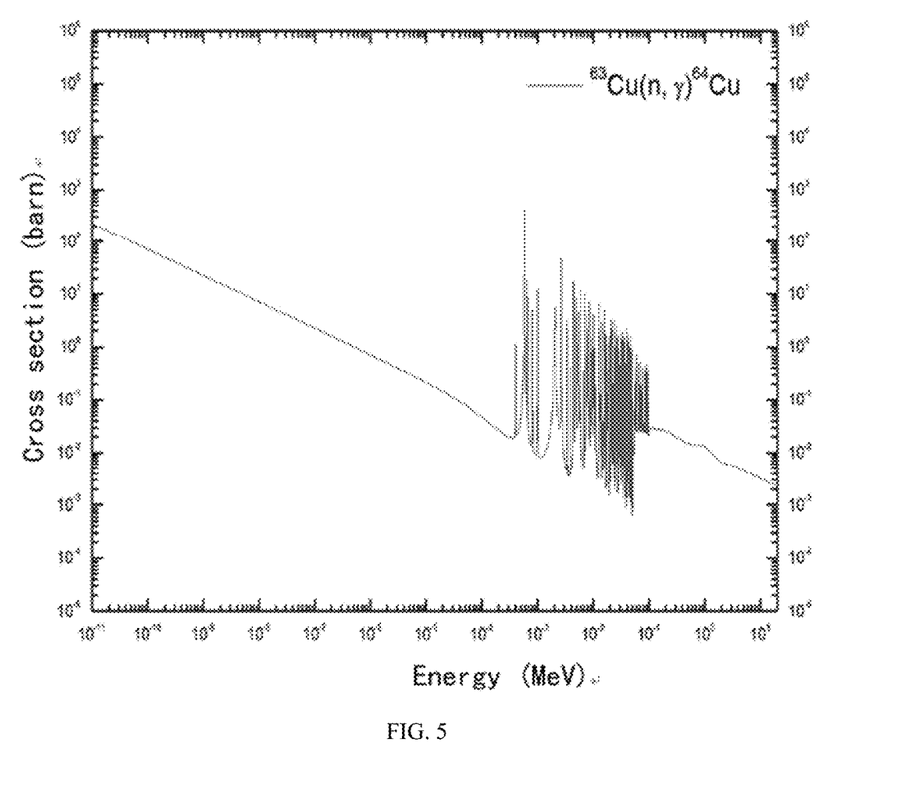
FIG. 5 is a cross-sectional view of the neutron action of $^{63}Cu$.

As shown in FIGS. 1 and 4 to 5, the natural copper sheet is used as the neutron conversion material 40 in this embodiment. The abundance of $^{63}Cu$ is 69.17%, and the abundance of $^{65}Cu$ is 30.83%, and the two main reactions after acting with thermal neutron are $^{63}Cu$ (n, γ) $^{64}Cu$ and $^{65}Cu$ (n, γ) $^{66}Cu$, which can be identified by the half-life of different nuclear after neutron activation. $^{64}Cu$ has a half-life of 12.71 hours and $^{66}Cu$ has a half-life of 5.1 minutes. Therefore, as long as enough cooling time, about 10 half-life time, is given to the conversion material after the end of the irradiation, and make the $^{66}Cu$ activity decay to a negligible range, then the latent image of the digital image plate 50 when receiving the exposure of the conversion material can be regarded as the contribution by the activity of $^{64}Cu$.

The conversion material 40 is placed in a 30×30×30 cm³ acrylic phantom and irradiated for 30 minutes at a depth of 2 cm and 5 cm in the phantom, and the size of the neutron activation conversion material is 20×20×0.0125 cm³. The radioactivity produced by the conversion material after irradiated by the boron neutron capture therapy beam is recorded by the digital image plate 50, and the recorded image is analyzed by a self-written image processing program to obtain the neutron intensity distribution. In addition to the two-dimensional and equal intensity distribution, radial or axial profile distribution curve can also be selected according to the needs.

2. The Step of Calculating and Obtaining the Neutron Dose in the Central Region of the Dosimeter The Monte Carlo method is a tool that can accurately simulate the collision trajectories and energy distributions of nuclear particles in the three-dimensional space inside the irradiated target. The Monte Carlo calculations should detail the proportions and geometries of chemical elements in each layer of the film, which can be provided by the film manufacturer. In this embodiment, the neutron dose at the center region Z of the film 30 can be calculated by inputting the element ratio and the geometrical structure of the EBT2 film 30 used aforementioned in the computer program for simulation.

3. The Step of Correcting the Neutron Detection Efficiency of the Dosimeter by the Neutron Relative Effect of Optical Density of the Dosimeter The $RE_n$ values mentioned in this embodiment are taken over the $RE_n$ values mentioned in the above-mentioned publication of Hsiao et al., or the calculation method thereof, as described in Table 2, for reference:

TABLE 2

$RE_n$ values at different depths from beam outlet

| Depth (cm) | $RE_n$ |
|---|---|
| 1 | 0.32 |
| 2 | 0.32 |
| 5 | 0.35 |
| 7 | 0.32 |
| 10 | 0.33 |
| 15 | 0.33 |
| 18 | 0.31 |

The gamma dose obtained in the film dosimeter is obtained by subtracting the neutron dose obtained in the film dosimeter from the weighted total dose of neutrons and gamma rays in the film dosimeter obtained by measurement.

In the above, a direct radiation dose measurement is performed using a dosimeter, but indirect radiation dose measurement may also be made with a dosimeter, as is well known to those skilled in the art. Indirect ionization radiation such as neutron and photon dose are caused mainly through the kinetic energy produced by the radiation on mass of substance per unit, known as kerma (kinetic energy produced per unit mass). Therefore, dose conversion of different materials, such as the conversion of the film action layer to an acrylic phantom, can also be carried out by kerma factor conversion, as shown in Formula (3).

$$D_a/D_b = \Phi F n_a / \Phi F n_b \quad \text{Formula (3)}$$

Wherein:
$D_a$: absorbed dose of material a (Unit: Gy)
$D_b$: absorbed dose of material b (Unit: Gy)
$\Phi$: neutron flux (Unit: neutrons/cm$^2$)
$Fn_a$: kerma factor of material a
$Fn_b$: kerma factor of material b While the foregoing description of the illustrative embodiments of the present disclosure has been described so that those skilled in the art will understand the disclosure, it should be understood that the disclosure is not limited to the scope of the specific embodiments. It will be apparent to those skilled in the art that various changes are within the spirit and scope of the disclosure as defined and determined by the appended claims, which are within the scope of the disclosure as claimed.

What is claimed is:

1. A radiation dose measuring method for a mixed radiation field of neutrons and gamma rays, comprising:
   a step of obtaining a total dose of neutrons and gamma rays by measuring with dosimeter; and
   a step of analyzing a neutron dose;
   wherein the step of analyzing a neutron dose comprises a step of calculating and obtaining a neutron dose in the center region of the dosimeter; a step of correcting the neutron detection efficiency of the dosimeter by the neutron relative effect of optical density of the dosimeter; and a step of analyzing neutron intensity distribution.

2. The radiation dose measuring method according to claim 1, wherein the dosimeter is selected from the group consisting of film dosimeter, thermoluminescent dosimeter, alanine dosimeter and gel dosimeter, and the dosimeter measures a planar two-dimensional dose or a three-dimensional dose of the mixed radiation field of neutrons and gamma rays.

3. The radiation dose measuring method according to claim 1, wherein the neutron dose of the central region of the dosimeter is calculated and obtained by a Monte Carlo method, and the neutron intensity distribution is obtained by irradiating a conversion material with radiation, wherein the radiation released by neutron activation of the conversion material is recorded by a digital image plate to measure the neutron intensity distribution, and the conversion material is a natural copper sheet.

4. The radiation dose measuring method according to claim 1, wherein the radiation dose measuring method is directed to a mixed radiation field of neutrons and gamma rays for a neutron capture therapy system.

5. The radiation dose measuring method according to claim 1, wherein the step of obtaining a total dose of neutrons and gamma rays by measuring with a dosimeter is a step of obtaining the total dose of neutrons and gamma rays by indirect measurement with the dosimeter.

6. A radiation dose measuring method for a mixed radiation field, wherein the mixed radiation field comprises a first ray and a second ray, wherein the radiation dose measuring method comprises:
   a step of obtaining a total dose of the first ray and the second ray by measuring with a dosimeter, wherein the first ray is a neutron ray; and
   a step of analyzing a neutron dose;
   wherein the step of analyzing a neutron dose comprises a step of calculating and obtaining a neutron dose in the center region of the dosimeter; a step of correcting the neutron detection efficiency of the dosimeter by the neutron relative effect of optical density of the dosimeter; and a step of analyzing neutron intensity distribution.

7. The radiation dose measuring method according to claim 6, wherein the radiation dose measuring method is directed to a mixed radiation field for a radiation therapy system.

8. The radiation dose measuring method according to claim 7, wherein the second ray is a gamma ray, and the radiation therapy system is a neutron capture therapy system.

9. The radiation dose measuring method according to claim 6, wherein the dosimeter is selected from the group consisting of film dosimeter, thermoluminescent dosimeter, alanine dosimeter and gel dosimeter, and the dosimeter measures a planar two-dimensional dose or a three-dimensional dose of the mixed radiation field of neutrons and gamma rays.

10. The radiation dose measuring method according to claim 6, wherein the neutron dose of the central region of the dosimeter is calculated and obtained by a Monte Carlo method, wherein the neutron intensity distribution is obtained by irradiating a conversion material with radiation, and the radiation released by neutron activation of the conversion material is recorded by a digital image plate to measure the neutron intensity distribution, wherein the conversion material is a natural copper sheet.

11. The radiation dose measuring method according to any one of claim 6, wherein the step of obtaining a total dose of neutrons and gamma rays by measuring with a dosimeter is a step of obtaining the total dose of neutrons and gamma rays by indirect measurement with the dosimeter.

12. A radiation dose measuring method for a mixed radiation field of neutrons and gamma rays, wherein the radiation dose measuring method comprises:
a step of obtaining a total dose of neutrons and gamma rays by measuring with a dosimeter; and
a step of separating the neutron dose and gamma dose;
wherein the step of separating the neutron dose and gamma dose comprises a step of analyzing the neutron dose; a step of obtaining the gamma dose by subtracting the neutron dose from the total dose of neutrons and gamma rays;
wherein the step of analyzing the neutron dose comprises a step of calculating and obtaining a neutron dose in the center region of the dosimeter; a step of correcting the neutron detection efficiency of the dosimeter by the neutron relative effect of optical density of the dosimeter; and a step of analyzing neutron intensity distribution.

13. The radiation dose measuring method according to claim 12, wherein the neutron dose of the central region of the dosimeter is calculated and obtained by a Monte Carlo method, wherein the neutron intensity distribution is obtained by irradiating a conversion material with radiation, and the radiation released by neutron activation of the conversion material is recorded by a digital image plate to measure the neutron intensity distribution, wherein the conversion material is a natural copper sheet.

14. The radiation dose measuring method according to claim 12, wherein the dosimeter is selected from the group consisting of film dosimeter, thermoluminescent dosimeter, alanine dosimeter and gel dosimeter, and the dosimeter measures a planar two-dimensional dose or a three-dimensional dose of the mixed radiation field of neutrons and gamma rays.

15. The radiation dose measuring method according to claim 12, wherein the radiation dose measuring method is directed to a mixed radiation field of neutrons and gamma rays for a neutron capture therapy system.

16. The radiation dose measuring method according to any one of claim 12, wherein the step of obtaining a total dose of neutrons and gamma rays by measuring with a dosimeter is a step of obtaining the total dose of neutrons and gamma rays by indirect measurement with the dosimeter.

* * * * *